United States Patent [19]

Koch et al.

[11] 3,933,519
[45] Jan. 20, 1976

[54] SUB-SEA PIPE CLEANING APPARATUS AND METHOD

[75] Inventors: George C. Koch; Paul M. Collins; William E. White, Jr., all of Houston, Tex.

[73] Assignee: HydroTech International, Inc., Houston, Tex.

[22] Filed: Apr. 25, 1974

[21] Appl. No.: 464,037

[52] U.S. Cl. .................... 134/34; 30/97; 134/18; 134/115 R; 134/152; 134/172; 134/181; 137/15; 137/315; 138/97; 285/15
[51] Int. Cl.².. F16L 55/18; B08B 3/02; F16L 55/18
[58] Field of Search .......... 134/33, 34, 7, 141, 123, 134/152, 172, 180, 181, 198, 18; 285/15; 138/97–99; 51/15; 30/97; 137/15, 315

[56] References Cited
UNITED STATES PATENTS

| | | | |
|---|---|---|---|
| 3,407,099 | 10/1968 | Schell | 134/33 |
| 3,585,699 | 6/1971 | Shuttle | 137/15 |
| 3,685,545 | 8/1972 | Smith | 138/99 |
| 3,807,047 | 4/1974 | Sherer et al. | 30/97 |
| 3,839,791 | 10/1974 | Feamster | 30/97 |
| 3,843,409 | 10/1974 | Ice, Jr. | 134/34 |

*Primary Examiner*—Barry S. Richman
*Assistant Examiner*—Dale Lovercheck

[57] ABSTRACT

Apparatus and method for cleaning the exterior surface of a pipe such as a pipe located in a sub-sea location having a coating of concrete or the like thereabout. The apparatus includes a generally longitudinal frame which supports a carriage for longitudinal traverse therealong. The carriage supports a high-pressure fluid nozzle which is arranged to direct the discharge thereof against the pipe coating which is to be removed. The carriage is arranged for longitudinal traverse along the frame, to thereby direct a high-pressure fluid stream into contact with the surface of the pipe. The frame is also arranged for rotation about the pipe, whereby a section of the pipe can be cleaned about its full circumference by a number of generally longitudinal runs along the pipe section being cleaned. The carriage may also support a wire cutter for cutting any re-enforcing wire after the concrete has been dislodged by the fluid nozzle. A pipe-cutter may also be attached to the apparatus for making a circumferential cut or cuts to remove a damaged section of pipe. The apparatus may be raised and lowered in a body of water to and from the cutting or cleaning position by a buoyancy tank attached thereto which is arranged to either raise or lower in a body of water in response to changes in the buoyancy factor of the tank, which may be controlled from the surface, for example.

15 Claims, 1 Drawing Figure

U.S. Patent    Jan. 20, 1976    3,933,519
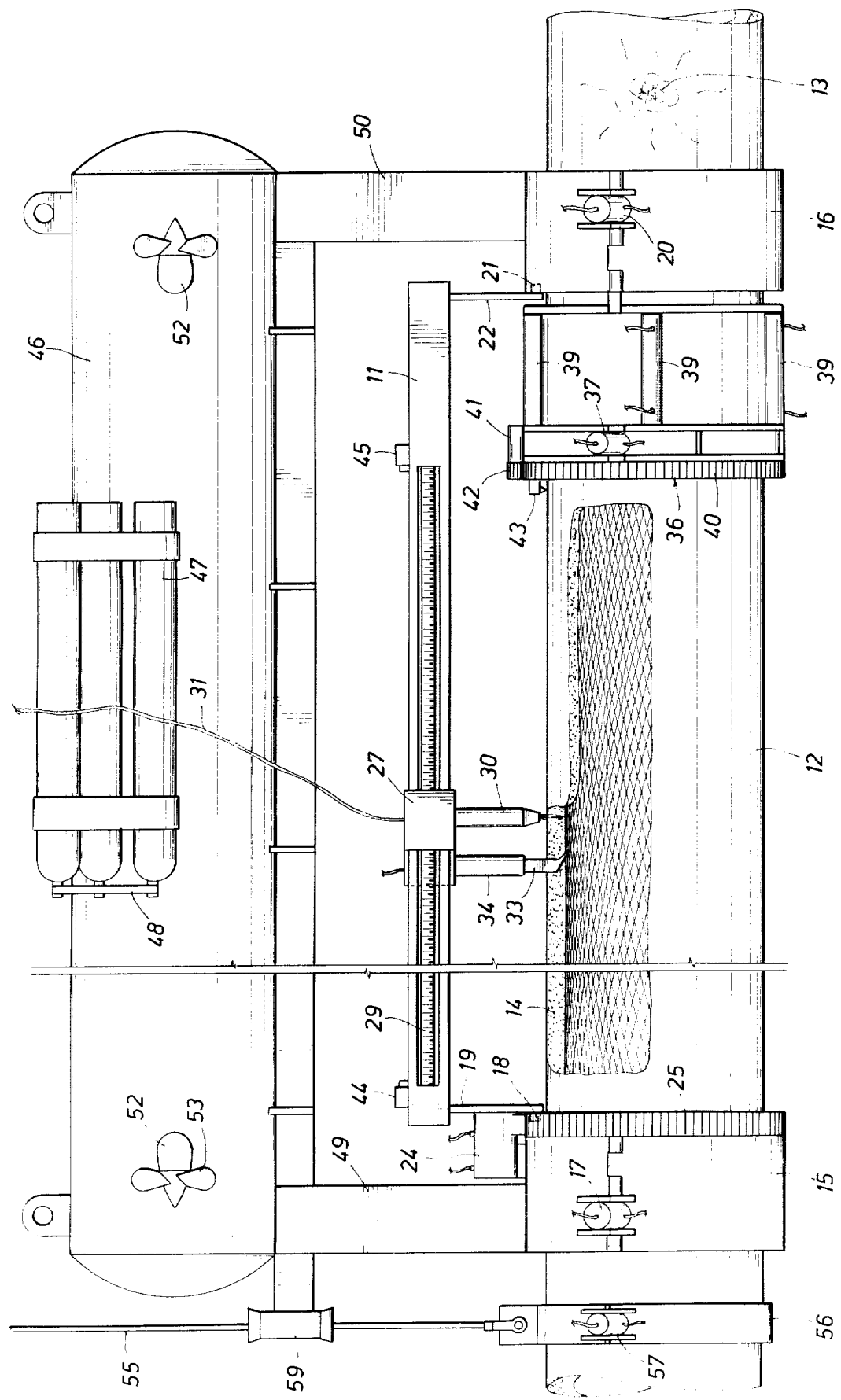

SUB-SEA PIPE CLEANING APPARATUS AND METHOD

BACKGROUND OF THE INVENTION

This invention relates to the field of pipe cleaning generally. More particularly, it relates to the method and apparatus of cleaning pipe such as pipe located in a sub-sea location, wherein concrete or the like is removed from the pipe by the present apparatus and method.

With increased production of oil and gas and the like in off-shore locations or in sub-sea locations, it is becoming more necessary to install pipelines for the purpose of transporting such fluids, quite often requiring the laying of pipeline along underwater locations. It is usually necessary to coat such pipe with a heavy external coating of concrete or the like in order to cause the pipe to remain in the submerged location rather than floating to the surface. Quite often, coated pipe of this type becomes damaged, either through natural forces acting on the pipe or through accidents, such as anchor damage by vessels utilizing the water space above the pipe. When damage to the pipe occurs, it may be necessary to cut out the damaged section and replace the damaged section with a spool of new pipe. In cutting out the damaged section and replacing it with a spool, it is necessary to clean the adjacent ends of the undamaged pipe so that the spool may be properly attached to the undamaged pipe. In addition, it is also necessary to have means for severing the pipe in the underwater location so that the new spool may be inserted and connected to the undamaged ends of the pipe.

Heretofore, repairs of the foregoing type have been very difficult and were usually made by divers descending to the level of the submerged pipe and carrying on the repair operation by hand-held tools, which, of course, was very inefficient, dangerous and time consuming, and impossible in some instances. Another method has been the lowering of a large bell-type habitat which would completely surround the area and provide workmen with a dry habitat in which to carry out the repair operation. Again, this is quite expensive and impossible in some instances.

It is, therefore, an object of this invention to provide an improved method and apparatus for the cleaning and repair of pipeline such as a submerged pipeline in a difficult working environment, which method, if desired, may be carried out remotely from the surface of the water, for example.

SUMMARY OF THE INVENTION

Briefly stated, the apparatus of this invention is for cleaning the exterior surface of a pipe as aforesaid. The apparatus includes a longitudinal frame which has means for supporting the frame in spaced parallel alignment with the longitudinal axis of the pipe which is to be cleaned. Means are provided for rotating the frame circumferentially of the pipe. A carriage is mounted on the frame for generally longitudinal traverse therealong, and means are provided for driving the carriage longitudinally therealong the frame. In addition, a high pressure nozzle is supported by the carriage for traverse therewith and is supported in such manner as to have the discharge end of the nozzle directed toward the surface of the pipe, which is to be cleaned. Means are provided for supplying pressurized fluid, such as sea water or the like, to the nozzle while the carriage is traversing the frame to thereby direct a high pressure stream of fluid into contact with the surface of the pipe to thereby clean the pipe. Means may also be supported by the carriage for severing wire re-enforcing which may become exposed during the cleaning of the pipe, as for example when concrete is being cleaned.

The apparatus also includes means for making a circumferential cut or cuts about the pipes to remove the damaged section of pipe. Navigation means may be operably connected to the frame for raising and lowering the frame in a body of water and guiding the apparatus to and from the sub-sea location, which navigation means may be in the form of a buoyancy tank.

The method of this invention is for removing coating from the exterior surface of the pipe in a sub-sea location. It includes in combination the steps comprising providing a coating removal apparatus having a longitudinal frame mountable and spaced in parallel relation to the longitudinal axis of the submerged pipe, with a nozzle supported by said frame, the nozzle being movable longitudinally and circumferentially of the pipe to direct a high-pressure stream of fluid into contact with different surface areas of the pipe, to disintegrate the coating and remove it therefrom. The method includes lowering the coating removing apparatus to the submerged pipe and securing it whereby the frame is positioned in spaced parallel relationship to the pipe as aforesaid. Thereafter, pressurized fluid is supplied to the nozzle at sufficient pressure and velocity to disintegrate the coating on the pipe which is being cleaned. The nozzle is moved longitudinally and circumferentially of the pipe to disintegrate and remove the coating therefrom.

BRIEF DESCRIPTION OF THE DRAWING

The drawing is generally a side-elevation view showing one preferred embodiment of the invention positioned in a sub-sea location and in the process of directing a jet of high-pressure water against the concrete coating on the submerged pipe.

DESCRIPTION OF THE PREFERRED EMBODIMENT

Referring now to the drawing, the apparatus of this invention for cleaning the exterior surface of a pipe will be described. The apparatus includes a generally longitudinally extending frame 11, which is generally supported in parallel alignment with the central axis of pipe 12, which is shown in a sub-sea location and which is also shown as having a damaged zone 13. Pipe 12 is also provided with a wire re-enforced concrete coating 14 which is shown being removed by the apparatus which will be described hereinafter.

Means are provided for supporting the frame in the aforesaid parallel alignment, which means includes a pair of segmented frame clamps 15 and 16. Each of the frame clamps 15 and 16 are segmented into two halves, each of which encircle half of pipe 12 and which halves are arranged for opening and closing by operation of hydraulic cylinders 17 and 20, respectively. Clamps 15 and 16 are designed so as to be loosely positioned about pipe 12 and are provided with inflatable packer linings (not shown) which, upon inflation, will firmly, yet gently, cause the clamps 15 and 16 to be secured and anchored to pipe 12 as shown in the drawing and without damage to concrete coating 14.

Frame clamp 15 is provided on the right side thereof, as viewed in the drawing, with an annular slot in which is fitted two circumferentially spaced keys 18, which are attached to a radially extending arm 19, the upper end of which is attached to and supported to one end of frame 11 as shown.

The left side of frame clamp 16, as shown in the drawing, is also provided with a similar annular slot in which is fitted a pair of circumferentially spaced keys 21, which are attached to another arm 22, which extends radially from the pipe and which supports the other end of frame 11. Hence, frame 11 is arranged for rotation about the pipe 12 while being supported by respective arms 19 and 22 and keys 18 and 21.

The apparatus also includes means for rotating frame 11 circumferentially about the pipe 12 and these include a reversable fluid motor 24 which is arranged to rotate at pinion gear (not shown) which is arranged to engage ring gear 25 which is attached to frame clamp 15. Motor 24 is mounted on arm 19 and as a consequence, when motor 24 is operated, frame 11 is caused to rotate circumferentially with respect to pipe 12 to provide indexing of the frame 11 about pipe 12.

Frame 11 has mounted thereon for longitudinal traverse therealong a carriage 27 which contains therewithin a longitudinal drive motor having a gear arranged for engaging worm gear 29 supported in a frame 11 as shown. Hence, operation of the motor supported by carriage 27 causes carriage 27 to move longitudinally on frame 11 and by selectively reversing direction of the aforesaid motor, carriage 27 may be caused to move back and forth along frame 11.

Carriage 27 supports a high pressure water nozzle 30 which is arranged for traversing with carriage 27 and has the discharge end thereof directed toward the surface of pipe 11, which is to be cleaned of coating 14. The pressure and velocity of water which is discharged through nozzle 30 will be determined by the type of material coating the pipe and the thickness thereof. For cleaning conventional concrete, it has been found that a standoff distance of aproximately one inch for the nozzle and a pressure of 5,000 PSI is considered adequate for such cleaning. By restricting the exit from nozzle 30, substantial velocities are reached which facilitates the cleaning operation of the water nozzle. The cleaning fluid may be sea water that is provided through pressure line 31 which may be connected to a source of pressurized sea water at the surface level, or other convenient sources.

The apparatus may also include means for severing any re-enforcingg wire which may be embedded in concrete coating 14. Such cutter means includes a wire-cutter blade 33 which is mounted on the end of a hydraulic piston which is supported inside hydraulic cylinder 34, whereby blade 33 can be extended or retracted as desired by operation of the aforesaid piston and cylinder.

The apparatus may also include means for cutting the aforesaid pipe 12 after cleaning thereof by making a circumferential cut or cuts thereabout so as to permit the removal of a section of damaged pipe. These cutting means may conveniently take the form of pipe cutter assembly 36 which is supported on the left side of frame clamp 16 and is similarly segmented for opening and closing about the pipe 12 by operation of hydraulic cylinder 37.

Cutter assembly 36 is attached to frame clamp 16 through a plurality of axially extending hydraulic piston and cylinder assemblies 39 which, upon actuation by either extension or retraction, are arranged to move the cutting portions of the assembly 36 axially with respect to pipe 12 whereby the exact position of the cut to be made can be adjusted. Cutter assembly 36 includes a rotatable ring gear 40 which is supported by the assembly 36 and is arranged for rotation by motor 41 attached to assembly 36. Motor 41 operates pinion gear 42 which engages ring gear 40 and causes rotation thereof relative to cutter assembly 36. Ring gear 40 supports a cutter blade 43 which is arranged for the cutting of pipe 12 after the same has been cleaned of concrete coating 14. It is to be understood that one suitable form of pipe cutter assembly 36 may be of the type manufactured by DND Corporation of Chicago, Ill. and sold under the trademark MARK V PORTA-CUTTER as, for example, their segmented model shown in their brochure No. 203-73-5M.

The aforesaid means for rotating frame 11 about pipe 12 may include means for automatically indexing frame 11 circumferentially of pipe 12 and this may conveniently take the form of limit switches 44 and 45 mounted on frame 11 at or adjacent the ends of the longitudinal runs of carriage 27, and for actuation by carriage 27. Limit switches 44 and 45 are arranged for providing a signal to motor 24 to cause the same to operate whereby frame 11 is indexed circumferentially about pipe 12 a desired distance. In addition, limit switches 44 and 45 may also be arranged to provide signals to the motor mounted in carriage 27 to effect reversing thereof so as to reverse direction of carriage 27. It will thus be seen that carriage 27 and nozzle 34 are thereby arranged for movement both longitudinally and circumferentially with respect to pipe 12.

The apparatus may also include navigation means operatively connected to frame 11 for navigating the frame 11 to the sub-sea location as shown in the drawing. One form of navigation means includes buoyancy tank 46, the buoyancy of which is controlled by a plurality of compressed gas cylinders 47 which are connected to discharge to buoyancy tank 46 through appropriate valved manifold 48, whereby the buoyancy of tank 46 can be controlled to either be raised or lowered in the body of water. Tank 46 is arranged for operative connection to frame 11 by means of a pair of struts 49 and 50, each of which is attached to one end of tank 46 at the top thereof and each of which is detached respectively at the lower end thereof to frame clamps 15 and 16.

Buoyancy tank 46 may be provided with a plurality of dynamic positioning units 52, each of which is comprised of a propeller 53 operated by appropriate motor so as to give directional thrust to buoyancy tank 46.

The apparatus may also include a guide cable 55 which attaches at its upper end to barge support means or the like and which at its lower end may be attached to a segmented guide clamp 56 which is arranged for clamping about pipe 12 by operation of hydraulic piston and cylinder assembly 57 in much the same manner as frame clamps 15 and 16. Cable 55 is arranged for passage through guide cone 59 which is attached to buoyancy tank 46 as shown. Hence, guide cable 55 provides additional guide means for raising and lowering the apparatus in the body of water.

In operation of the aforesaid described apparatus, guide clamp 56 may be first installed about pipe 12 in the manner shown in an area adjacent to the point where the pipe is to be cleaned. Thereafter, guide cone 59 may be mounted about cable 55 and the apparatus lowered by operation of and control of buoyancy tank 46, whereby the entire unit is then lowered to the sub-sea location with frame clamps 15 and 16 initially opened and thereafter clamped about pipe 12 as shown.

Pipe 12 is then cleaned of the concrete coating 14 by operation of water nozzle 30 as aforesaid. The full circumference of a section of pipe 12 may be cleaned by indexing frame 11 thereabout and moving carriage 27 back and forth. If the coating 14 includes re-enforcing wire, then it may be severed by operation of wire-cutter blade 33. Once the full circumference of pipe 12 has been cleaned by indexing carriage 17 around pipe 12 as aforesaid, then pipe 12 may be severed by actuation of blade 43 of pipe-cutter assembly 36 as described above. In certain circumstances, the section of the pipe to be cleaned may be resting on a mud bottom. In this case, it may be necessary to initially excavate such mud by use of a high pressure fluid nozzle, or by other conventional means, so that cleaning of the pipe can be effected all the way therearound.

Once the foregoing pipe cleaning operation is completed, the apparatus may be removed from the pipe in the reverse sequence as described above and reattached at some point which is axially spaced from the initial point to effect another cleaning and cutting operation. In this manner, a spool of pipe may be removed and thus permit the installation of a new spool in a manner that is well known to those skilled in the art. The foregoing operations may be performed remotely from a surface barge, for example, without the requirement for a diver or with minimum requirements for a diver.

It will thus be apparent that this invention provides an improved apparatus and method for cleaning the exterior surface of a pipe such as a pipe located in a sub-sea location, which cleaning operation can be carried out substantially remotely from the location of the cleaning and which can be done with a minimum of diver usage. Hence, pipe cleaning operations which have heretofore been very difficult, time consuming and expensive, as described above, can now be made more efficiently, more quickly and with a minimum of diver personnel by use of the present invention. In certain instances, television cameras may be attached to bouyancy tank 46, or other portions of the apparatus, to facilitate remote operation.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a method of cleaning the exterior surface of pipe in a sub-sea location, the combination of steps comprising:

supporting a high pressure nozzle on a frame for longitudinal movement thereon;
supporting said frame in spaced parallel relationship with the longitudinal axis of said pipe and said nozzle with the discharge end directed against said pipe;
supplying high pressure fluid to said nozzle to thereby effect cleaning of said pipe;
moving said nozzle longitudinally along said frame while supplying said fluid to said nozzle to thereby clean in a generally longitudinal direction along said pipe surface;
and moving said frame and nozzle circumferentially of said pipe, to thereby clean said pipe.

2. The invention as claimed in claim 1 including the additional step of:

initially excavating mud from beneath that portion of said pipe which is to be cleaned, whereby said frame and nozzle may be rotated around the full circumference of said pipe during the cleaning steps.

3. In a method for removing coating from the exterior surface of pipe in a sub-sea location, the combination of steps comprising:

providing coating removal apparatus including a longitudinal frame mountable in spaced parallel relation to the longitudinal axis of said submerged pipe and a nozzle supported by said frame, said nozzle being movable longitudinally and circumferentially of said pipe to direct a high pressure stream of fluid into contact with different surface areas of said pipe to disintegrate the coating and remove it therefrom;
lowering said coating removal apparatus to said submerged pipe and securing it whereby said frame is positioned in spaced parallel relation to said pipe as aforesaid;
supplying pressurized fluid to said nozzle, and
selectively moving said nozzle longitudinally and circumferentially of said pipe of disintegrate and remove the coating therefrom.

4. Method as defined in claim 3 wherein:

the lowering of said coating removal apparatus to said submerged pipe is procured by providing means for guiding said coating removal apparatus between the surface and the sub-sea location of said pipe.

5. Method as defined in claim 4 and further including the step of:

providing means for positioning said coating removal apparatus in axial alignment with said submerged pipe in the lowered position thereof whereby said coating removal apparatus can then be secured to said pipe as aforesaid.

6. In apparatus for cleaning the exterior surface of a pipe in fixed position, the combination comprising:

a longitudinal frame;
means rigidly attachable to said pipe for supporting said frame in spaced parallel alignment with the longitudinal axis of said pipe;
means disposable radially outwardly of said exterior pipe surface for selectively rotating said frame about the entire circumference of said pipe while the said pipe remains in said fixed position;
a carriage mounted on said frame for longitudinal traverse therealong;
means for driving said carriage longitudinally along said frame;

a high pressure nozzle supported by said carriage for traverse therewith and having the discharge end thereof directed toward said surface of said pipe;

and means for supplying pressurized fluid to said nozzle to thereby direct a high pressure stream of fluid into contact with said surface of said pipe to clean said pipe.

7. The invention as in claim 1 wherein:

said pipe includes wire reinforced concrete on the external surface thereof, which concrete is capable of being cleaned from said exterior pipe surface by said pressurized fluid to expose said reinforcing wire, and further including:

means supported by said carriage for severing said exposed reinforcing wire.

8. The invention as defined in claim 6 including:

switch means actuable in response to travel of said carriage to the end of a longitudinal run for causing reverse movement of said carriage on another cycle by said drive means.

9. The invention as claimed in claim 6 wherein:

said support means comprises a plurality of segments having hydraulic actuation means for opening and closing said segments about said pipe.

10. The invention as claimed in claim 6 including:

means connected to said support means for automatically causing rotation of said frame circumferentially of said pipe in response to said carriage reaching the end of a longitudinal traverse along said pipe.

11. The invention as defined in claim 10 wherein:

said automatic means includes switch means actuable in response to travel of said carriage to the end of a longitudinal path to move said frame a predetermined distance circumferentially of said pipe.

12. The invention as defined in claim 6 wherein said pipe is disposed in a sub-sea location and including:

navigation means operatively connected to said frame for navigating said frame to the sub-sea location of said pipe.

13. The invention as defined in claim 12 including:

a guide cable attachable to said submerged pipe and extendable upwardly to a surface support, said guide cable being operatively connected to said navigation means to facilitate navigational operations thereof.

14. The invention as defined in claim 12 wherein:

said navigation means includes a buoyancy tank operatively connected to said frame to facilitate raising and lowering thereof in a body of water.

15. The invention as defined in claim 14 wherein:

said navigation means includes propulsion means connected to said tank for propelling same under water.

* * * * *